Patented June 16, 1925.

1,542,615

UNITED STATES PATENT OFFICE.

EDWARD FRANCIS GERMAIN, OF SAGINAW, MICHIGAN, ASSIGNOR, BY MESNE ASSIGNMENTS, OF THREE-FOURTHS TO L. GERMAIN, JR., TRUSTEE, OF PITTSBURGH, PENNSYLVANIA.

COMPOSITION OF MATTER FOR MAKING FLUSH TANKS, WATER-CLOSET SEATS, AND COVERS.

No Drawing.    Application filed June 19, 1923.    Serial No. 646,474.

*To all whom it may concern:*

Be it known that I, EDWARD FRANCIS GERMAIN, a citizen of the United States, residing at Saginaw, county of Saginaw, and State of Michigan, have invented a new and useful Improvement in Composition of Matter for Making Flush Tanks, Water-Closet Seats, and Covers, of which the following is a full, clear, and exact description.

The present invention relates to a new composition of matter particularly adapted for the production of flush-tanks, water-closet seats and covers, and the like.

It has heretofore been proposed to manufacture flush-tanks and the like from a composition consisting of distilled rosin, fine asbestos and long asbestos fibre. A composition of this character is not entirely satisfactory, as tanks or the like made therefrom, if subjected to sudden expansion or contraction due to rapid temperature changes, are liable to crack, since both ordinary rosin and distilled rosin are not of long enough fibre to withstand this treatment.

Moreover, composition tanks generally are open to the objection that they soften at comparatively low temperatures and are not absolutely immune to acid attack. This makes them unsuitable for use in heated rooms, and greatly restricts both their use and period of usefulness.

I have discovered, as the result of exhaustive experiments, carried on over a considerable period of time, a new composition of matter for the production of flush-tanks and the like adapted to give to such stuctures all the highly desirable and necessary qualities, such as superior physical strength, ample heat resistance and immunity to acid attack.

My new composition consists of a mixture of asphaltic material, preferably gilsonite, fine asbestos and long asbestos fibre. The relative proportions of the materials may be varied within certain limits and good results obtained, but the most satisfactory results are obtained by using the ingredients within the following proportions: fourteen to seventeen pounds of gilsonite, ten to sixteen pounds of fine asbestos, and three to six pounds of long asbestos fibre.

The process for the production of articles from my new composition consists of mixing the gilsonite, fine asbestos and long asbestos fibre together, placing the mixture in a suitable receptacle and heating the same until it forms a composition of a consistency somewhat similar to bread dough after the same has been freshly worked ready for baking, or of putty. The composition while in this state is placed in a suitable mold and formed into the desired shape under hydraulic pressure. Sufficient time is allowed for the material to set and become perfectly hard. After the product has been thus formed, it is given a coating of shellac to prevent the finish, which will be white, from turning yellow. After the shellac has dried, a suitable coating, such as two coats of flat and a final coating of white enamel, may be applied in making a white tank.

It will be understood that variations in the proportions of the ingredients above set forth and in the steps of the process as described may be made without departing from the spirit of my invention or the scope of my claims, and that the composition described may be applied to the manufacture of other structures than flush-tanks and water-closet seats and covers.

I have made numerous tests of sections of tanks made from my new composition, and such tests have shown that my composition results in a structure which has a very high tensile strength together with great resistance to heat. These tests have shown that the present composition produces a structure which will withstand temperatures up to substantially 300 degrees F. before softening, thereby greatly increasing its range of usefulness. Furthermore, these tests have shown that acids, such as hydrochloric and sulphuric acids, have no objectionable or deleterious action on my composition material, whereas such acids produce effects upon other composition materials, such as generally used for tanks, varying from only a slight action to complete disintegration in twenty-four hours.

My composition produces a structure which possesses sufficient flexibility to obviate danger of cracking when subjected to sudden temperature changes, and this quality is attributable, I believe, particularly to the gilsonite in the composition.

Another highly desirable characteristic of my composition is that it produces a structure which is absolutely impervious to water, it being impossible to induce my composition to absorb water even under pressure either directly from the presses or after the finish has been applied.

I claim:

1. A composition of matter, containing at least 30% gilsonite, fine asbestos and long asbestos fibre, substantially as described.

2. A composition of matter, containing fourteen to seventeen parts of gilsonite, ten to sixteen parts of fine asbestos, and three to six parts of long asbestos fibre, substantially as described.

3. A composition of matter, consisting substantially of gilsonite, fine asbestos, and long asbestos fibre, substantially as described.

4. A composition of matter, containing fourteen to seventeen parts of asphalt, ten to sixteen parts of fine asbestos, and three to six parts of long asbestos fibre, substantially as described.

In testimony whereof I have hereunto set my hand.

EDWARD FRANCIS GERMAIN.